(12) United States Patent
Grojean et al.

(10) Patent No.: US 9,051,958 B2
(45) Date of Patent: Jun. 9, 2015

(54) BLIND RIVET BOLT

(75) Inventors: Alex Grojean, Commercy (FR);
Maxime Grojean, Commercy (FR);
Eric Massebeuf, Quintal (FR)

(73) Assignee: G FORCE, Commercy (FR)

( * ) Notice: Subject to any disclaimer, the term of this patent is extended or adjusted under 35 U.S.C. 154(b) by 0 days.

(21) Appl. No.: 14/111,213

(22) PCT Filed: Apr. 27, 2012

(86) PCT No.: PCT/IB2012/052138
§ 371 (c)(1),
(2), (4) Date: Oct. 11, 2013

(87) PCT Pub. No.: WO2012/147068
PCT Pub. Date: Nov. 1, 2012

(65) Prior Publication Data
US 2014/0037398 A1    Feb. 6, 2014

(30) Foreign Application Priority Data

Apr. 29, 2011    (FR) ...................................... 11 53662

(51) Int. Cl.
| F16B 31/00 | (2006.01) |
| F16B 39/34 | (2006.01) |
| F16B 37/06 | (2006.01) |
| F16B 39/36 | (2006.01) |

(52) U.S. Cl.
CPC ............... *F16B 39/34* (2013.01); *F16B 37/067* (2013.01); *F16B 39/36* (2013.01)

(58) Field of Classification Search
USPC .......... 411/1, 2, 3, 5, 383, 428, 432, 500, 501
See application file for complete search history.

(56) References Cited

U.S. PATENT DOCUMENTS

| 4,544,312 | A  | * | 10/1985 | Stencel ............................. 411/3 |
| 5,333,980 | A  | * | 8/1994  | Pratt et al. ..................... 411/501 |
| 5,391,028 | A  | * | 2/1995  | Charles .......................... 411/374 |
| 6,357,953 | B1 | * | 3/2002  | Ballantyne ...................... 403/43 |
| 6,776,566 | B2 | * | 8/2004  | Kobusch et al. .............. 411/546 |
| 7,241,097 | B2 | * | 7/2007  | Dembowsky et al. ......... 411/369 |
| 8,545,152 | B2 | * | 10/2013 | Kuenkel et al. .................. 411/7 |
| 2003/0215303 | A1 | * | 11/2003 | Makino .......................... 411/39 |
| 2008/0107499 | A1 | * | 5/2008  | Denham et al. .............. 411/548 |
| 2011/0014008 | A1 | * | 1/2011  | Mahikian ...................... 411/432 |

FOREIGN PATENT DOCUMENTS

| DE | 10253888 A1 | 12/2003 |
| EP | 0077858 A1 | 5/1983 |
| EP | 0382638 A1 | 8/1990 |
| EP | 1961976 B1 | 5/2012 |
| GB | 1269924 | 4/1972 |

* cited by examiner

Primary Examiner — Roberta Delisle
(74) Attorney, Agent, or Firm — William H. Eilberg (57) ABSTRACT

A bolt (1) includes a screw (3) and an insert (2) which can be inserted in the opening (19) of a wall (5). The insert (2) includes an insert head (6) and a shaft (7) including a recess (8), the insert head (6) and the recess (8) being configured such as to, after deforming the recess (8), crimp the insert (7) on the wall (5). The screw (3) includes a break ring (14) designed for engaging with the insert head (6), directly or indirectly, with a view to deforming the recess (8) by rotating the screw and thus to obtain the crimping, and designed such that, once crimping is complete, the ring breaks and releases the screw (3) from the insert head (6), thus making it possible to clamp an accessory (4) to the wall (5). The invention also includes an assembly method using a bolt (1) according to the invention.

29 Claims, 6 Drawing Sheets

BLIND RIVET BOLT

TECHNICAL FIELD OF THE INVENTION

The present invention relates to the field of assembly of parts, in particular for situations where there is access only from a single side of the assembly.

More particularly, it relates to a blind rivet bolt which makes it possible to assemble two or a plurality of parts, whilst having access only from a single side of the assembly, or wherein access to the second side is difficult.

In the field of assembly of accessories or metal plates on a support, it is frequently necessary to have to operate in blind conditions, with access being possible only from a single side of the assembly. This can be the case for example for securing metal plates on a wall or on a framework, where it is very difficult to operate from both sides of the wall, or wherein this would at least need the intervention of a second person.

Known solutions exist for nailing, riveting or screwing into the mass, which permit assembly with access from a single side. However, depending on the materials, these assembly modes may not be sufficiently solid, and it may be necessary or desirable to be able to use the other side of the wall in order to secure a nut or insert made of a selected material.

For this purpose, it is known to put a nut of this type into place by means of crimping. This consists of using an insert comprising a head and a tapped part, introducing the tapped part via the accessible side, then, by means of traction between the tapped part and the head, deforming an intermediate part, i.e. the recess, such that the tapped part and the head grip the wall. The insert is thus attached to the wall, and can cooperate with a screw in order to secure a part on the wall.

However, several disadvantages have been observed on this type of assembly.

In particular, the tightening between the head of the insert and the nut may not be sufficient to prevent the insert from turning under the effect of the screwing, during the introduction of a screw into the nut for assembly of a part on the wall. The assembly then becomes very difficult, since no means is provided in order to prevent the rotation of the nut.

Document FR 2 515 283 discloses a rivet nut comprising grooves below its head, which are impressed in the wall during the crimping, thus preventing its rotation.

Then, the tool which exerts the traction between the nut and the insert head can damage the tapping of the nut, and its use with an assembly screw may prove difficult.

Document FR 2 642 802 describes a rivet nut with a stem which is designed to exert the crimping force without coming into contact with the tapping of the nut. Thus, this tapping is not damaged by the crimping force.

However, these solutions according to the prior art have significant disadvantages. In fact, time elapses between the moment when the nut is put into place and the moment when a screw is introduced into it, and during this time dirt may be introduced into the nut, and then disrupt the screwing. It is then necessary to organize two distinct operations, i.e. one in order to crimp the nut, and the other in order to introduce the screw, which increases the assembly cost. In addition, it is not always easy to align a screw along the axis of the tapping of an insert, which also increases the difficulty and the risks of assembly. Skewed engagement of a screw in a tapped insert may give rise to destruction of these assembly components. In addition, the operator responsible for introducing the screw is very often not the one who put the insert into place, which spreads the responsibilities and is detrimental to the efficiency of production. Finally, when tapping is not used to put the insert into place, an opportunity is lost to check for the presence of the tapping; in fact, it may happen that inserts leave a production chain without a tapping, the thread having broken, and this having been taken into account only after a plurality of inserts have left the production chain. The wall is then equipped with one or a plurality of inserts which have an incorrect or no tapping, and then needs to be repaired or rejected.

Document EP 1 961 976 describes a rivet bolt, for which the crimping of the insert and the screwing of the screw are carried out in a single operation, the insert head comprising a deformable part, which, by being deformed, allows the screw head to support a washer on the accessory to be secured. However, this solution makes it possible to compensate only for very small variations of thickness, and makes it necessary to adapt a bolt dimension precisely to each type of assembly. In addition, subsequent dismantling of an assembly of this type is very difficult.

DESCRIPTION OF THE INVENTION

The object of the present invention is to eliminate these disadvantages at least partly.

For this purpose, the invention proposes a bolt comprising a screw and an insert which can be inserted in the opening in a wall, said insert comprising an insert head and a shaft comprising a recess, said insert head and said recess being configured such as, after deformation of the recess, to ensure the crimping of said insert on said wall.

The device is distinguished in that said screw comprises a break ring, which, by being supported on said insert head directly or indirectly, is designed to immobilize said screw relative to said insert head, in order to create the deformation of the recess by rotation of the screw and obtain said crimping, and, once the crimping has been carried out, it is designed to give rise to breakage, such as to release the screw from said insert head, thus permitting the tightening of an accessory on the wall.

This breakage can be a mechanical breakage in the break ring or in bracing means.

By means of these arrangements, the screw can be introduced into the insert before the crimping, which makes it possible firstly to prevent the risks of introduction of dirt into the insert between the crimping and the screwing, and secondly to permit crimping and screwing in a single operation. In addition, a single screw dimension makes it possible to carry out assembly of accessories with various thicknesses, or also of a plurality of superimposed accessories, and the accessory can be dismantled simply by unscrewing.

According to other characteristics:

said breakage can take place in the break ring, the insert can comprise a means for blocking the rotation of said insert; this makes it possible to prevent the insert from turning when the screw is to be tightened; this therefore guarantees that the screwing is always possible when torque is applied to the screw; this blocking means can be obtained by resistive friction, or also by means of any form with a non-circular transverse cross-section; this can be one or a plurality of protuberances or grooves placed on the exterior of the insert, or an oval or polygonal form, said means for blocking in rotation can be an external hexagonal form; this represents a form which is easy to manufacture, and can concern the shaft of the insert, thus blocked relative to the wall, or it can concern the insert head, which can then be blocked relative to the wall, or relative to the accessory, said bolt can additionally comprise bracing means provided between said break ring and the insert head, and comprising a washer; a washer of this type makes possible a smaller design of the break ring, its outer diameter needing to be larger than the inner diameter of the washer, whereas, without a washer of this type, in general its outer diameter must be sufficient to be supported on the insert head; a washer of this type can also be designed with a divisible part, the break ring then giving rise to the breakage of this divisible part, and itself remaining integral with the screw body, said bolt can additionally comprise bracing means provided between said break ring and the insert head, and comprising a tubular element provided with a radial spreaded part which can be supported against the insert head; in this case, it is possible to create a break which occurs in the break ring and/or a break which separates at least part of the radial spreaded part of the tubular element; it is possible to create only a break which separates at least part of the radial spreaded part of the tubular element, in particular when the break ring is constituted by the screw head itself, the screw can comprise a screw head provided with a base which is designed to be supported on the accessory, directly or by means of a washer, thus ensuring better application of the forces of support of the screw head on the accessory, a cavity can be provided below said base in order to accommodate in it at least partially said break ring and/or the bracing means, said insert head, said break ring and, if applicable, said bracing means can be configured such that, in the assembled position, the screw head is supported on the insert by means of the break ring and/or bracing means, without being supported on said accessory, such as to constitute an attachment which allows said accessory to be mobile in rotation and/or translation relative to the wall, said screw can comprise a non-threaded part provided with a widened part, designed to make it possible to fix the break ring by forcing it to slide towards said widened part during the screwing phase which follows its breakage, thus making it possible to avoid any nuisance, in particular noise nuisance, which would be derived from the mobility of this ring relative to the screw, in particular when a large number of bolts of this type is being manipulated. This widened part can have several forms, i.e. an increase in diameter, grooves, or the like, said insert can have weakening of the recess, such as to facilitate its deformation during the crimping, this weakening preferably taking the form of undercuts, in particular three undercuts; these undercuts can be situated distributed on the circumference of the recess, and can be blind or can open out, the insert can contain a lubricant, preferably grease; this lubricant facilitates the screwing by reducing the friction, and then protects the bolt against corrosion, in particular in the area where the breakage is made, which can affect the state of the surface and affect the resistance to corrosion, said screw can comprise a non-threaded part, contained between the screw head and the threaded part, which does not cooperate with the tapped part of the insert, such as to provide resilience necessary to create the tension of the screw on said bolt in the tightened situation, even when the thicknesses of the accessories and walls are very slight.

The present invention also relates to a method for securing an accessory on a wall by means of a bolt according to the invention, said accessory comprising an accessory opening designed to allow the insert head to pass through, and said wall comprising a wall opening designed to allow the shaft of the insert to pass through. This method is distinguished in that it comprises the following steps:

a) arrangement of the accessory on the wall, such as to align the accessory and wall openings, b) introduction of the bolt into the openings thus aligned, in the direction from the accessory towards the wall, until the insert head is applied on the wall, c) rotation of the screw, with a thread of the screw cooperating with a tapping of the insert, the break ring being supported on the insert head, if applicable by means of bracing means, thus creating deformation of the recess below the wall, and consequently carrying out the crimping of the insert on the wall, d) increasing the torque until the breakage is obtained, thus releasing the screw from the insert head, e) continuation of rotation of the screw until the accessory is tightened on the wall.

BRIEF DESCRIPTION OF THE DRAWINGS

The present invention will be better understood by reading the following detailed description provided with reference to the attached drawings in which:

FIGS. 12 and 13 are views in cross-section of two variants of assemblies with a bolt according to the second embodiment of the invention.

DESCRIPTION OF PREFERRED EMBODIMENTS

Figure 1:
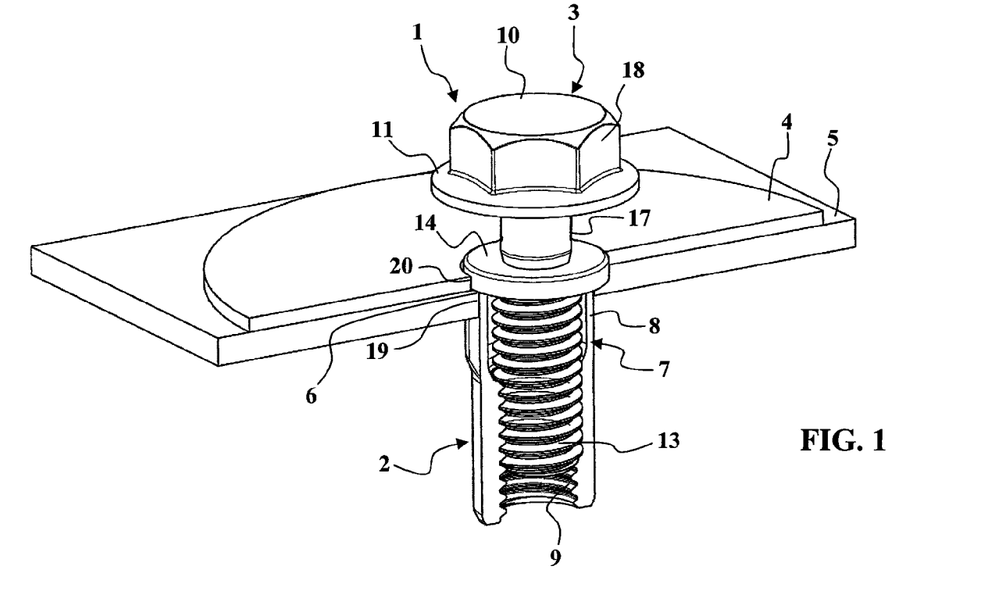
FIG. 1 is a view in perspective and in partial cross-section of an assembly with a bolt according to a first embodiment of the invention.
Figure 4:
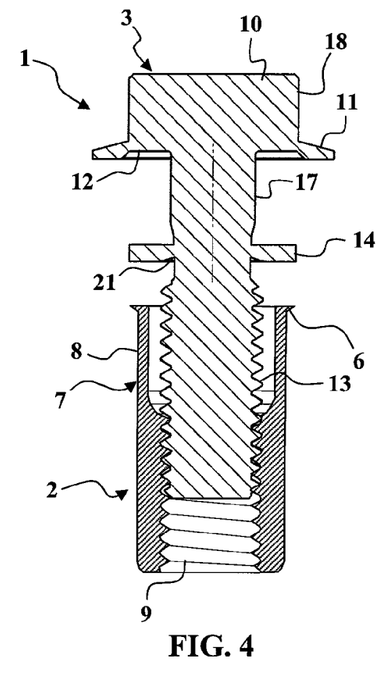
FIG. 4 is a view in cross-section of the bolt in FIG. 1.
Figure 5:
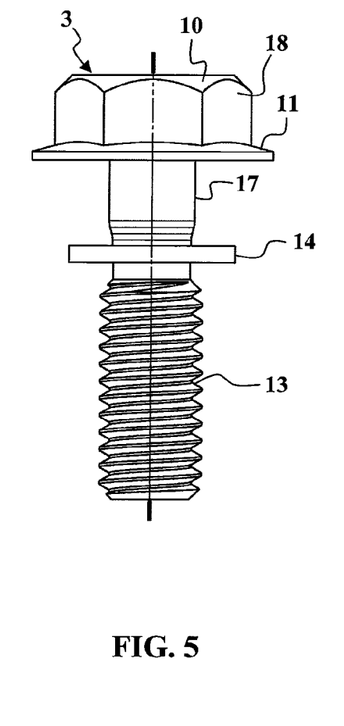
FIG. 5 is a lateral view of the screw of the bolt in FIG. 4.

FIGS. 1, 4 and 5 illustrate a first embodiment of the invention, in which a bolt 1 is constituted by an insert 2 and a screw 3.

Figure 2:
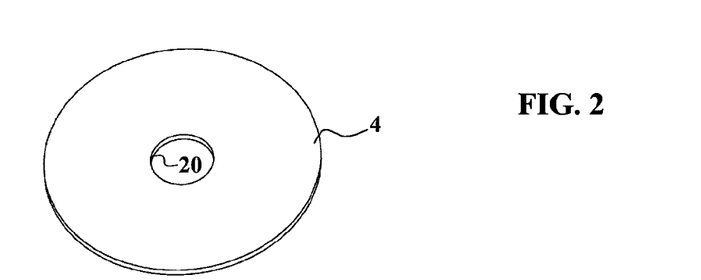
FIG. 2 is a view in perspective illustrating schematically an accessory.

This bolt 1 makes it possible to secure an accessory 4 (FIG. 2) on a wall 5 (FIG. 3) in a situation in which it is possible to access only a single side of the wall 5.

The insert 2 comprises an insert head 6 and a shaft 7 comprising a recess 8 and a tapped part 9 with an inner thread.

The screw 3 comprises a screw head 10, comprising an indentation 18, a base 11 with a cavity 12 (FIG. 4) a part 13 which is threaded on the exterior, and a break ring 14.

The threaded part 13 of the screw 3 permits screwing of the screw 3 in the tapped part 9 of the insert 2 of the bolt 1.

The function of the insert head 6 is firstly to ensure the resistance to unfastening when the screw part 3 no longer ensures that the accessory 4 is placed on the wall 5, and when a force tends to thrust the insert 2 towards the inaccessible part of the wall 5.

When the insert head 6 is put into use, its function is to position the bolt 1 in translation. The insert head 6 is supported on the accessible surface of the wall 5, which indicates that the screwing can begin. The insert head 6 must have a diameter and height small enough to permit good support of the screw head 10 on the accessory 4. In certain cases when the thickness of the accessory is large, it can be advantageous to increase the height of the insert head within the aforementioned limits, in order to provide a guiding function when assembly of the accessory is recommenced, and/or to reinforce the unfastening and/or to reinforce the resistance to shearing. The insert head also has dimensions large enough to withstand the crimping force transmitted by the break ring 14, as well as the breakage force in said break ring 14 which is supported on the insert head 6.

The shaft 7 can have a hexagonal outer form which makes it possible to retain the insert 2 angularly in the opening with a hexagonal form in the wall. This angular, anti-rotation retention provided by the fitting of these two complementary hexagonal forms in one another allows the insert 2 to resist the torque forces which are transmitted to it by the screw 3 during the steps of crimping, tightening and untightening. It will be appreciated that other forms with a non-circular transverse cross-section are possible, whilst remaining within the context of the invention, such as one or a plurality of protuberances or grooves provided on the exterior of the insert 2, or an oval or polygonal form, these forms being able to be applied to the shaft 7 and/or to the insert head 6.

The shaft 7 comprises an area where its wall is thin, known as the recess 8, with a hexagonal inner form (like the outer form), or a circular form. Any form of weakening of the wall or undercut, for example three undercuts which do or do not open out, distributed around the circumference, can be envisaged in order to allow the recess 8 to be deformed more easily during the crimping, and then to be strong enough to withstand the forces applied to the insert 2. The thickness and the inner form of the recess 8 are calibrated so as to be deformed by the stress transmitted by the axial tension obtained from the torque applied to the screw head 10. The deformation of the recess 8 makes it possible to crimp the insert 2 on the wall 5. After deformation, the recess 8 assumes the form of a collar 15 which grips the wall 5 between said collar 15 placed on the non-accessible side of the wall 5 and the insert head 6 on the accessible side. The crimping collar 15 thus withstands a large number of forces, i.e. the torsion torque during the steps of crimping, tightening or untightening, and the wrenching force during the crimping and tightening. It is therefore essential to take these parameters into account when selecting the dimensions of the recess 8.

The shaft 7 also comprises a tapped part 9 which has dimensions such as to receive the thread of the screw 3, and to withstand the torque forces transmitted by the screw 3, as well as to resist the wrenching forces which are applied on the tapping of the insert 2 during the crimping and tightening of the assembly, and the stress on the assembly.

The end of the shaft 7 can be open or blind, depending on the embodiments. The blind form makes it possible to seal the assembly.

The screw 3 can be seen better in FIGS. 4 and 5.

The screw head 10 comprises a male or female indentation 18 (hexagonal, 6 hollow facets, or 6 lobes for example) which permit the transmission of the torque from the tightening tool (spanner, screw driving machine, special tools) to the screw 3.

The base 11 forms the support on the accessory 4, making it possible to put the assembly under tension. The base 11 is provided with a cavity 12 below the screw head 10. The purpose of this cavity 12 is to receive part or all of the break ring 14 in order to guarantee that the accessory 4 is placed on the wall 5. This cavity 12 can also accommodate at least partly any bracing means which will be described subsequently.

The break ring 14 has dimensions such as to immobilize the screw 3 in translation relative to the insert head 6 during the transmission of the force necessary for the deformation of the recess 8 and thus for the formation of the collar 15 for crimping of the insert 2.

In a first embodiment illustrated in FIGS. 1, 4 and 5, the break ring 14 is designed to be supported directly against the insert head 6, and also has dimensions such as to break under a load greater than that necessary for the crimping, and smaller than that which the screw 3 can accept without being subjected to plastic deformation which is detrimental to the function of the screw assembly. The break in the break ring 14 allows the screw 3 to enter the phase of tightening of the assembly, which had hitherto been prevented by the presence of the break ring 14, which prevented the screw head 10 and the surface of the accessory 4 from moving towards one another. The break ring 14 is characterized by three dimensions, i.e. its thickness which permits calibrated breakage at a given force, its diameter in order to guarantee sufficient support on the top of the insert head 6, and its distance from the lower surface of the screw head 10, the variation of which makes it possible to adapt to very different thicknesses of accessories 4 to be secured on the wall 5.

The break ring 14 can also comprise a breakage starting point 21 which assists the breakage. The breakage starting point takes the form of weakening of the thickness of the break ring 14 in the vicinity of the diameter of the body of the screw 3, as illustrated in FIG. 4.

In this first embodiment, when the break ring 14 has been broken and does not leave any radial projections on the periphery of the stem of the screw 3, there is nothing further to oppose the penetration by screwing of the screw 3 into the insert 2. Consequently, with a single bolt 1 structure, it is possible to assemble walls 5 and accessories 4 with thicknesses which can vary within a wide range of thicknesses. By way of example, with a bolt 1 provided with a screw 3 of type M6, it is possible to adapt to a thickness from 1 mm (wall 5 of 0.5 mm and accessory 4 of 0.5 mm) up to a thickness of 8 mm (wall 5 of 3 mm and accessory 4 of 5 mm).

Figure 6:
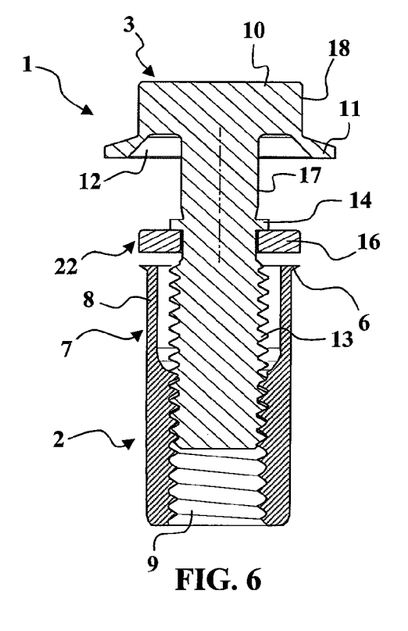
FIG. 6 is a view in cross-section of a bolt according to a second embodiment of the invention.
Figure 7:
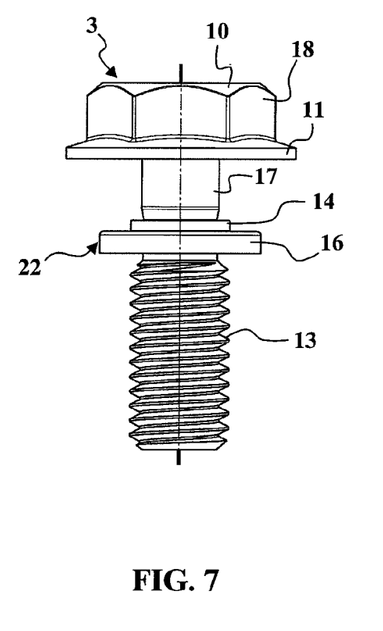
FIG. 7 is a lateral view of the screw of the bolt in FIG. 6, FIGS. 8 to 11 are views in partial cross-section illustrating the use of a bolt according to the second embodiment of the invention for the assembly of an accessory on a wall.

According to a second embodiment of a bolt 1 according to the invention, the bolt additionally comprises bracing means 22 comprising a washer 16 (FIGS. 6 and 7).

The bracing means 22 are designed to be interposed between the insert head 6 and the break ring 14. The break ring 14 then has dimensions such as to immobilize the screw 3 in translation in the insert 2 during the transmission of the force necessary for the deformation of the recess 8 and thus for the formation of the collar 15 for crimping of the insert 2, taking into account the presence of the washer 16.

In a first variant of the second embodiment, the break ring 14 also has dimensions such as to break under a load greater than that necessary for the crimping and smaller than that which the screw 3 can accept without being subjected to plastic deformation which is detrimental to the function of the screw assembly. The breakage in the break ring 14 allows the screw 3 to enter the phase of tightening of the assembly, which had hitherto been prevented by the presence of the break ring 14, which prevented the screw head 10 and the surface of the accessory 4 from moving towards one another. The break ring 14 is characterized by three dimensions, i.e. its thickness which permits calibrated breakage at a given force, its diameter in order to guarantee sufficient support on the washer 16, and its distance from the lower surface of the screw head 10, the variation of which makes it possible to adapt to different thicknesses of accessories 4 to be secured on the wall 5.

The washer 16 of the bracing means 22 makes it possible to form the mechanical connection between the insert head 6 and the break ring 14. This washer 16 is characterized by its outer diameter, which must ensure the support on the insert head 6, such as to transmit the crimping force; via its inner diameter which permits the support of the break ring 14 in an area as close as possible to the stem of the screw 3; and via its thickness which must not disrupt the assembly operation, as well as its being subjected to mechanical tension. Its resistance to breakage must permit breakage in the break ring 14 which then becomes totally or partly separated from the screw 3.

The washer 16 makes it possible to localize better the breakage force of the break ring 14 close to the stem of the screw 3; in addition, during the crimping phase, it makes it possible to reduce the friction forces of the break ring 14, by reduction of the mean diameter of application of the friction forces.

This first variant of the second embodiment has the same advantage as the first embodiment in terms of adaptation to a wide range of thicknesses of wall 5 and accessory 4.

Figure 14:
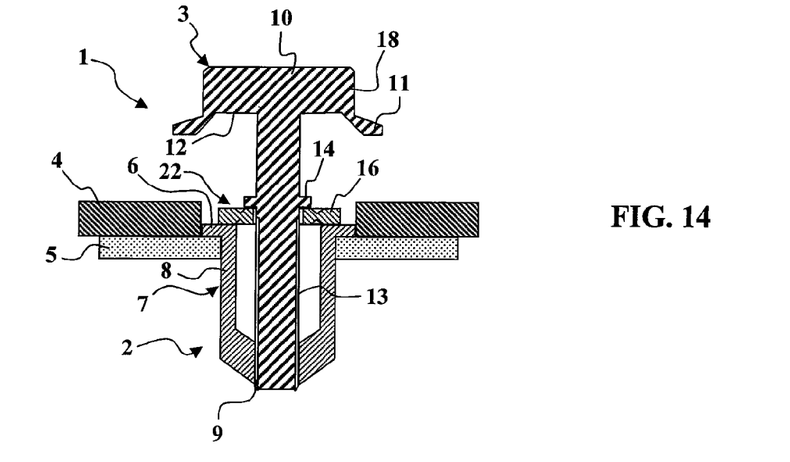
FIGS. 14 to 16 are views in cross-section of a variant of the second embodiment of the invention.
Figure 15:
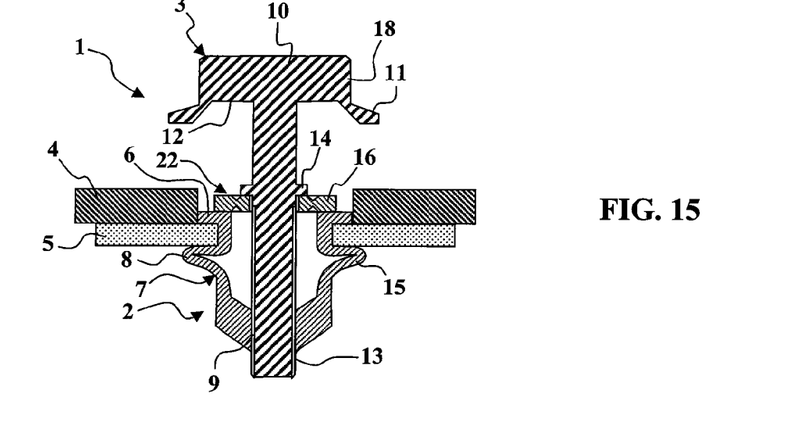
Figure 16:
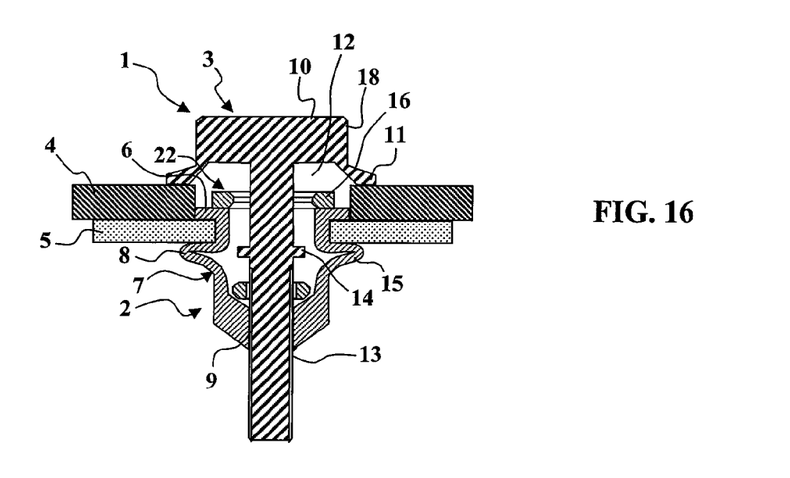

In a second variant of the second embodiment, illustrated in FIGS. 14 to 16, the break ring 14 is supported on the insert head 6 by means of the washer 16 during the crimping phase, then gives rise to a breakage in the washer 16, which releases the screw 3 from the insert head 6, such that the accessory 4 can be tightened by continuing the tightening of the screw 3. The break ring 14 then continues to be integral with the body of the screw 3.

FIGS. 8 to 11 illustrate four steps of implementation of the first variant of the second embodiment of the invention.

It is wished to secure one or a plurality of accessories 4 on a wall 5 without access possible to the rear of the wall 5, or with access possible, but difficult. In the place of the wall 5, it is also possible to consider any support on which it is wished to secure an accessory. The entire operation must be carried out from the single accessible side of the wall 5. In order to secure accessories 4 of this type, it is generally necessary to have a plurality of securing points. For simplicity of the description, a description will be provided hereinafter of putting into place of an accessory 4 on a wall 5 by means of a single bolt 1. It will be easy for persons skilled in the art to organize the operation with a plurality of accessories 4, walls 5 and/or bolts 1, or with securing onto supports other than a wall.

Figure 3:
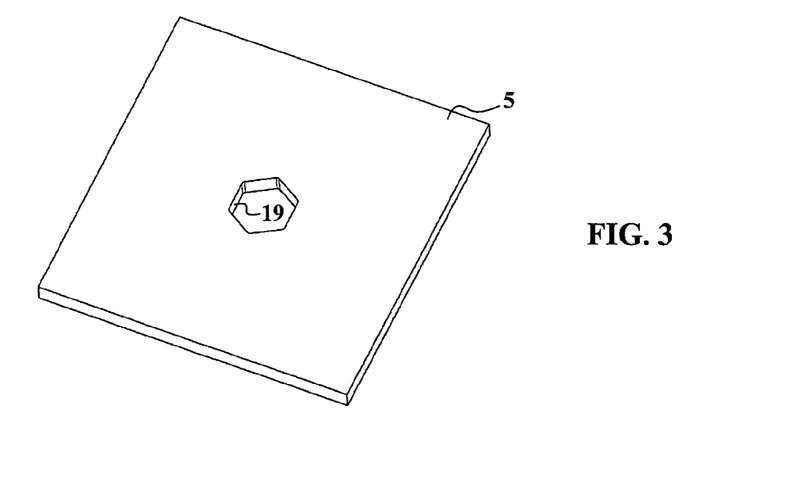
FIG. 3 is a view in perspective illustrating schematically a wall.

Firstly, it is necessary to provide an opening in the wall 5, for example a hexagonal opening as illustrated in FIG. 3. This opening can be obtained by means of cutting, punching, or any other means. It can also be obtained directly by molding. This then provides what will be known as the wall opening 19.

It is then necessary to provide an opening in the accessory 4. This opening can be obtained by cutting, punching or molding, but also by means of a drill, the opening, which will be known as the accessory opening 20, being able to be circular (see FIG. 2). This accessory opening 20 can also have a hexagonal form as a means for blocking the insert head in rotation. The accessory opening 20 can also have an elongate form, for example it can have the form of an oblong hole, in order to facilitate the positioning of the accessory 4 on the wall 5, which can otherwise be complicated because of the existence of a plurality of bolts 1. In fact, in order to reduce the manufacturing costs, it can be advantageous not to be constrained by tolerances which are excessively narrow. The consequence is that the positioning of some openings relative to others also allows some divergences of tolerance, which divergences can be eliminated by means of the elongate forms of the accessory openings 20.

The accessory 4 can then be positioned on the wall 5. Depending on the weight and size of the accessory 4, it can be positioned by an operator who carries it, or by means of a template, or by an assembly mounting. The important thing is to align the accessory 20 and wall 19 openings, in order to permit the introduction of the bolt 1.

Figure 8:
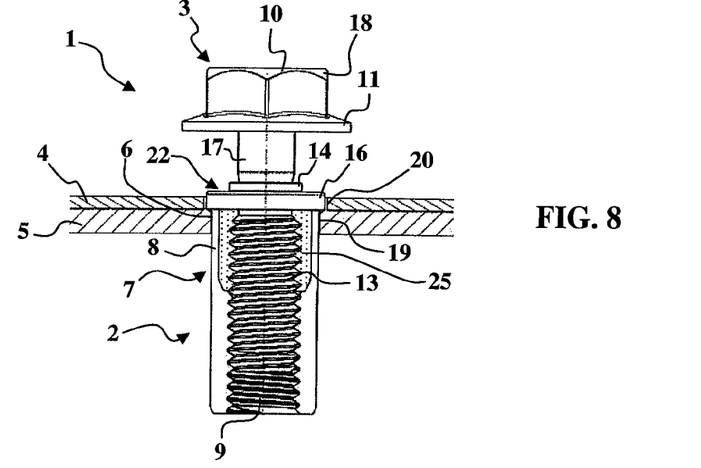

The bolt 1 consists of the insert 2 and the screw 3 preassembled in the insert 2, and screwed as far as the position in which the break ring 14 is supported against the insert head 6 by means of the washer 16 (see FIG. 8). The insert 2 contains a lubricant 25 such as grease. The lubricant 25 can advantageously be applied in the insert 2 and/or on the screw 3 before they are assembled.

It will be appreciated that the bolt 1 can also be preassembled with the screw 3 which is engaged less deeply in the insert 2, with the break ring 14 not being supported on the insert head 6. The contact between the break ring 14, by means of bracing means 22 with a washer 16, and the insert head 6, is then obtained in place after the first turns of the screw carried out by the power bolter.

It is also possible to supply the bolt 1 not assembled, with the inserts 2 on the one hand, and the screws 3, and if applicable the bracing means 22, on the other.

This bolt 1 is then brought onto the nose of a special power bolter or any other suitable installation tool. It is then introduced into the openings, beginning with the accessory opening 20, then the wall opening 19. It is the insert 2 side of the bolt 1 which is introduced into the openings, with the screw head 10 remaining in the nose of the installation tool, in order to carry out the screwing subsequently. The bolt 1 is considered to be in position when the lower surface of the insert head 6 is in flat contact with the wall 5 (see FIG. 8). The insert head 6 has then passed through the accessory opening 20, the latter having a dimension which allows the insert head 6 to pass through it.

The screwing of the screw 3 is then begun. The torque is applied by the power bolter on the screw head 10 by means of the indentation 18. The screwing gives rise to raising of the tapped area of the insert 2, thus giving rise to the formation of a collar 15 at the level of the shaft 7 (see FIG. 9). The collar 15 thus formed generates a surface which is supported on the rear surface of the wall 5. The insert 2 is then crimped on the wall 5.

Figure 9:
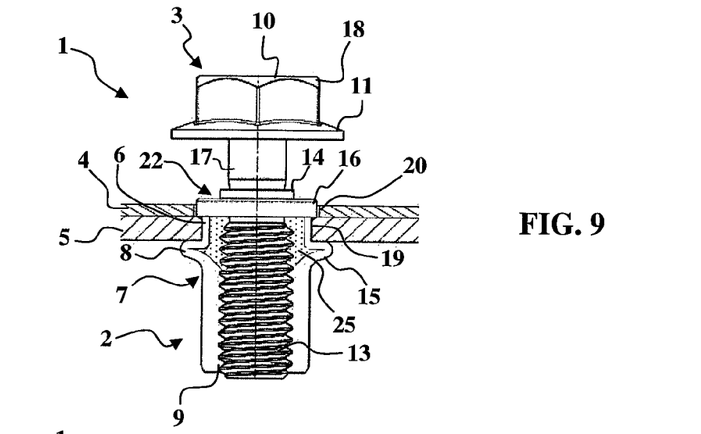

The screwing is then continued, which produces a shearing force in the break ring 14, until breakage of at least part of the latter is caused. The broken part of the break ring 14 then slides in translation along the non-threaded part of the screw 3, and no longer opposes the penetration by screwing of the screw 3 into the insert 6.

Figure 10:
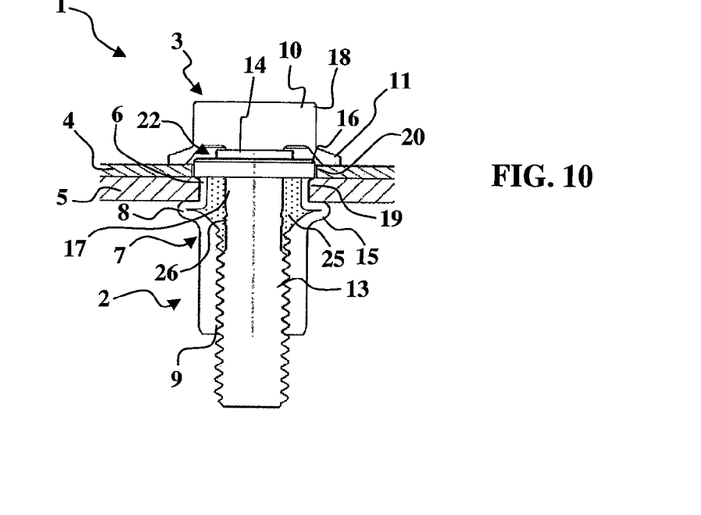

The screwing is then continued until the screw head 10 is tightened against the accessory 4 (see FIG. 10). The accessory 4 and the wall 5 are then placed and under tension against the collar 15 and the screw head 10. By means of a widening 17 of the diameter of the non-threaded part of the screw 3 situated between the break ring 14 and the inner surface of the screw head 10, during the screwing phase which follows the breakage of the break ring, the break ring 14 is forced to slide along this increased diameter. Thus, the break ring 14 is fixed on the screw 3, thereby avoiding any nuisance, and in particular noise nuisance, which can be derived from vibrations during manipulations after dismantling.

At the end of screwing (FIG. 10), the area 26 to which the break ring 14 was connected before the breakage is coated with grease, and is therefore protected against corrosion.

In order to dismantle the accessory 4, it is sufficient to unscrew the screw 3, remove it, and then remove the accessory 4. The insert 2 remains in place and integral with the wall 5 (see FIG. 11), and can be used once more to form another assembly and receive another screw 3, or receive the same screw once more.

Figures 11, 12, 13:
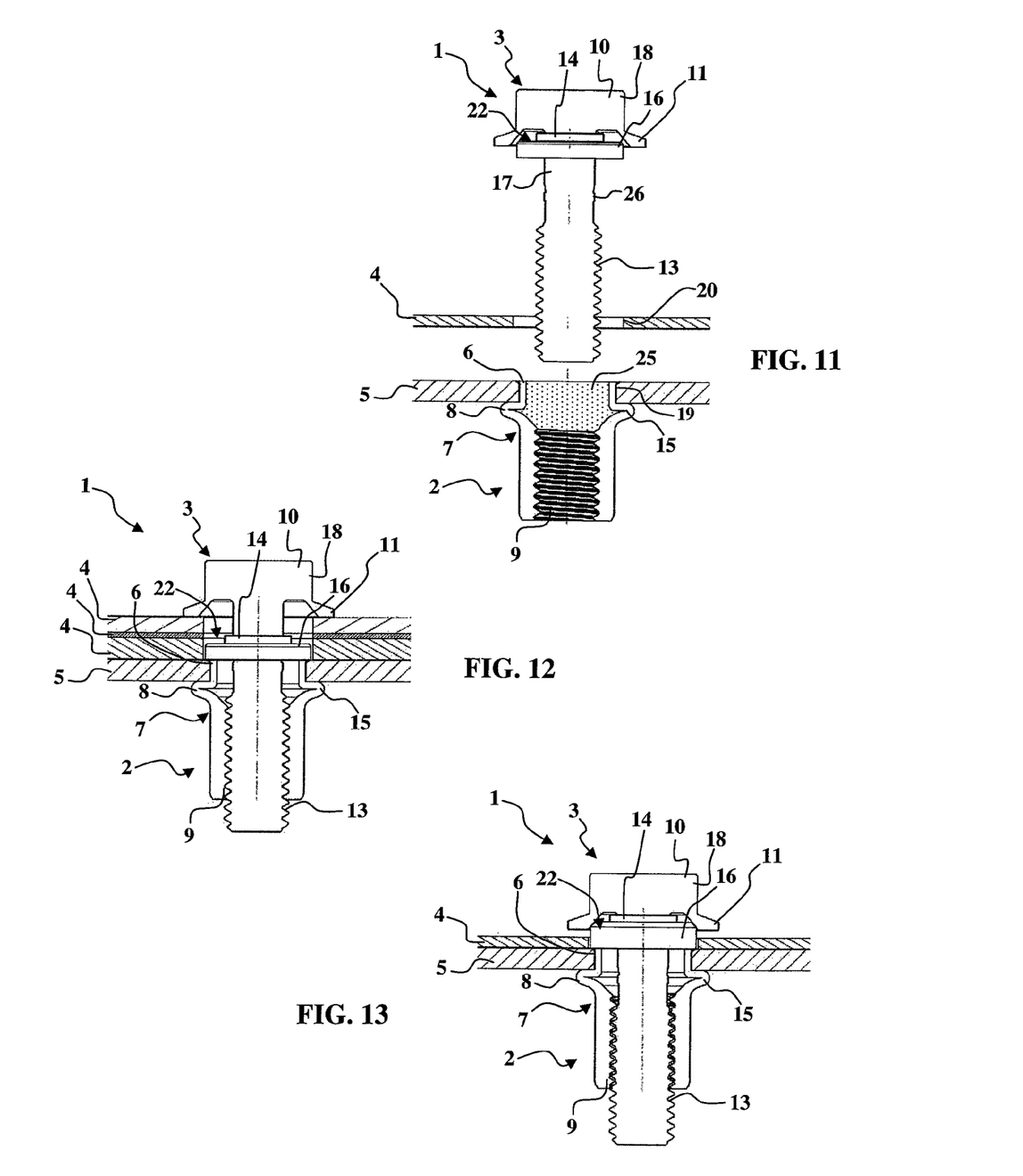

FIG. 12 illustrates the securing of a plurality of accessories 4 on a wall 5.

FIG. 13 illustrates a variant of the second embodiment, wherein the insert head 6, the break ring 14 and the bracing means 22 with a washer 16 have dimensions such that the screw head 10 is supported on the insert head 6 by means of the bracing means 22 (in this case the washer 16). This arrangement makes it possible to provide an assembly of the pivot type for example, wherein the accessory 4 is mobile in rotation relative to the wall 5, since the base 11 of the screw head 10 is not supported on the accessory 4.

As an alternative, the retention of the base 11 spaced from the accessory 4 can be guaranteed by supporting the screw head 10 on the insert head 6 by means of the washer 16 and the break ring 14, or, when there are no bracing means 22, by means of the break ring 14 alone.

According to other variants, the insert head 6, the break ring 14, and if applicable the bracing means 22, have dimensions such that the screw head 10 is supported on the accessory 4, but after slight, calibrated deformation of the accessory 4, the screw head 10 is supported on the insert head 6 by means of the break ring 14 and/or the bracing means 22. In order to obtain this arrangement, it is possible to adapt the thickness of the bracing means 22, the thickness of the break ring 14, the thickness of the insert head 6 and/or the geometry of the screw head 10 (reduction or elimination of the cavity 12 below the base 11 for example). This arrangement makes it possible to use the bolt 1 according to the invention with the functionality of a compression limiter, which is advantageous for securing certain accessories 4, in particular made of plastic material, which would otherwise be deformed under the stress applied by the screw head 10, and thus give rise to untightening of the assembly.

Figure 17:
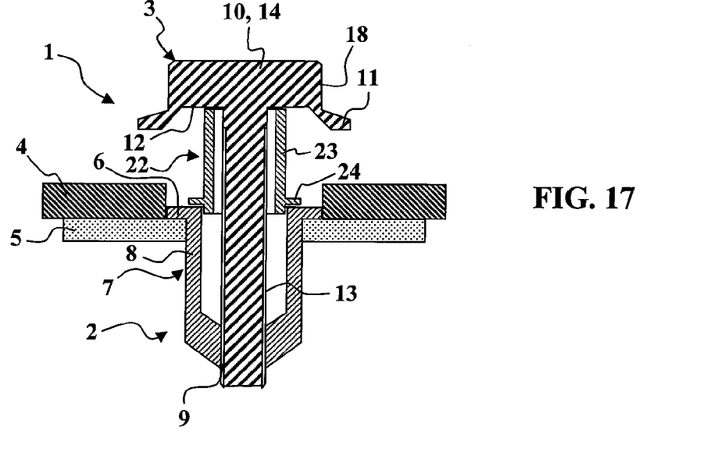
FIGS. 17 to 19 are views in cross-section of a bolt according to a third embodiment of the invention.
Figure 18:
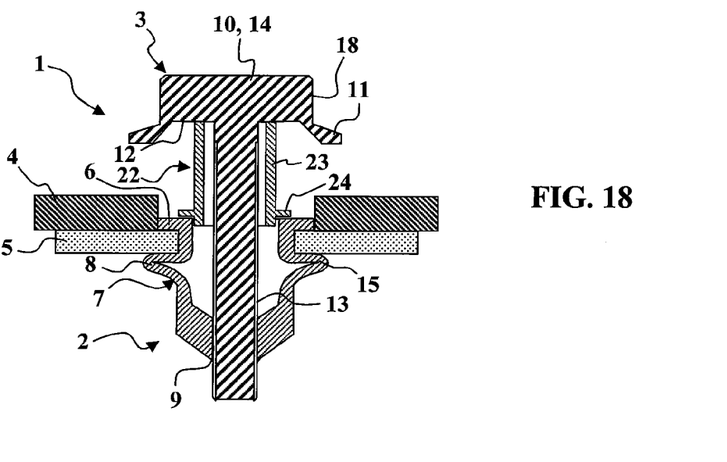
Figure 19:
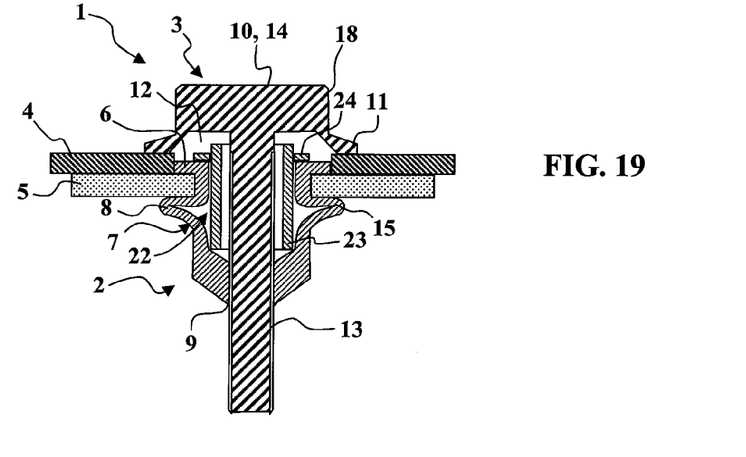

FIGS. 17 to 19 illustrate a third embodiment of the invention. As in the second embodiment of the invention, the latter comprises bracing means 22. In this third embodiment, the break ring 14 is constituted by the screw head 10. The bracing means 22 are thus arranged between the insert head 6 and the break ring 14 of the screw 3. The break ring 14 is thus supported indirectly against the insert head 6 by means of the bracing means 22.

The bracing means 22 comprise a tubular element 23 provided with a radial spreaded part 24 which can be supported against the insert head 6.

During the use of this third embodiment according to the invention, the bolt 1 is firstly arranged as illustrated in FIG. 17. The screw 3 is then rotated by screwing by means of a tool. With the screw 3 being kept immobile relative to the insert head 6 and the wall 5 by the bracing means 22 and the break ring 14, the screwing gives rise to deformation of the recess 8 and raising of the tapped area of the insert 2, until the insert 2 is crimped on the wall 5 (FIG. 18).

The screwing is then continued, which produces a shearing force in the bracing means 22, until breakage is caused which separates the tubular element 23 and the radial spreaded part 24. The tubular element 23 then penetrates into the deformed recess 8 of the insert 2. The screw 3 is no longer immobilized relative to the wall 5, and can thus, by being screwed into the crimped insert 2, by means of its screw head 10 tighten the accessory 4 on the wall 5.

This third embodiment of the invention makes it possible to use a standard screw 3 which therefore has a reduced cost: instead of being provided on an intermediate section of its stem as in the embodiments illustrated in FIGS. 1 and 4 to 16, in this case the break ring 14 is constituted by the screw head 10 itself.

However, it should be noted that the screw 3 as illustrated in FIGS. 1 and 4 to 16, including a break ring 14 provided on an intermediate section of the stem of the screw 3, can be used in the place and instead of the screw illustrated in FIGS. 17 to 19. In this case, it is possible to produce a breakage which occurs either in the break ring 14 or in the bracing means 22 (by separation of the tubular element 23 and the radial spreaded part 24).

In all the embodiments of the invention, the break ring 14 is in the form of an annular shoulder secured on the screw 3 (part in a single piece or added on), which comes into contact with the insert head 6 or bracing means 22 according to an annular support surface or in the form of a circular ring.

In the case when bracing means 22 which are designed to break are used, the break ring 14 can be in the form of a shoulder between a proximal section of screw 3 which extends from the screw head 10, and a threaded distal section with an outer diameter which is smaller than that of the proximal section. For this purpose it is possible to use a standard shoulder screw.

The insert 2, the screw 3 and the bracing means 22 can be manufactured according to known techniques, such as cold heading, screw cutting, or cutting and drawing, or injection, in particular for parts made of plastic material. According to the manufacturing methods, it is then necessary to tap the insert 2 and roll the thread 13 of the screw 3, then if necessary carry out heat treatment and/or surface treatment. The screw 3 can also be made to carry out the tapping 9 of the insert 2 when it is introduced into the insert 2.

The insert 2 and/or the screw 3 can be made of carbon steel, stainless steel, titanium, aluminum, polymer, or any other material used for securing components or accessories.

The wall 5 can be made of metal plate, or it can be a hollow body made of steel, stainless steel, aluminum, copper, brass, titanium, carbon fiber, plastic, wood, or the like.

The accessory 4 can be made of steel, stainless steel, aluminum, copper, brass, titanium, carbon fiber, plastic, wood, or the like. It can be an accessory such as a panel or an electric control box.

The advantages of the invention are the following in particular:

a) making it possible to bolt two blind elements using a single component and in a single assembly operation, whereas hitherto it has been necessary to put into place in a first stage a blind rivet nut or any other tapped device which can be incorporated blind on the wall 5, then to complete the assembly in a second stage by screwing a screw which passes through the accessory 4 to be assembled and is placed in the tapping of the tapped insert which equips the wall 5. An inverse assembly is also possible by using a blind male rivet insert and a nut. It should be noted that in many cases in the prior art, the mounting of a tapped insert and a screw is carried out by two different people, whereas with the bolt 1 according to the invention, mounting of this type is carried out by a single operator, b) optimizing the assembly times by means of the reduction of the assembly operations, and thus generating increases in productivity which make it possible to reduce the costs associated with the assembly functions. The most costly and time-consuming operation associated with putting an insert into place is eliminated, c) facilitating the assembly processes by eliminating all of the problems associated with the screwing:
- no more problems of screwability associated with paint deposited on the threaded/tapped part of the insert,
- no more problems of screwability associated with the depositing of welding slag on the threaded/tapped part of the insert, if the latter is a welded component or a component used near an area affected by a welding operation carried out after the insert has been put into place,
- no more problems of screwability associated with the deterioration of the tapped or threaded area of the insert, generated by the implementation process, i.e. crushing of the insert under the press, deformation of the threads when they are used for installation (for example: blind male or female rivet insert),
- no more problems of screwability associated with poor coaxiality of the tapping or threading of the insert put into place,
- no more assembly problems associated with the lack of tapping or threading of the screw put into place,
- no more assembly problems associated with the lack of tapping or threading of the insert put into place,
- no more assembly problems associated with the lack of an insert,
- no more problems of separation of the insert from its support during the engagement of the screw, when the latter has been assembled by one of the conventional assembly means (crimping, welding, etc.),
- no more problems of separation of the insert from its support during handling of the wall equipped with this insert, when the latter has been assembled by one of the conventional assembly means (crimping, welding, etc.),
- no more problems of assembly tension associated with incompatibility between the insert and screw,
- no more problems of assembly tension associated with differences of class (which make it possible to classify the bolt and screw accessories according to their mechanical strengths) between the insert and screw,
- no more problems of resistance to torque of the insert when the screw is being screwed (no more problems of jamming for example), d) eliminating quality control phases by elimination of the reasons for their application, and therefore reduction of the costs, and quality optimization. In fact, quality controls are only palliative solutions, and it is more relevant to eliminate their causes, e) no more problems of development of corrosion associated with incompatibility of surface treatment between the insert and screw, f) no more problems of jamming associated with incompatibility of surface treatment between the insert and screw, g) perfect positioning of the two walls to be assembled, by means of the absence of projection between the accessory 4 and wall 5, as in the case of a cage nut or blind rivet nut, h) substantial, controlled positioning force corresponding to the class of the screw 3 part (for example: 8.8, 10.9, . . . ), i) a high level of shearing resistance thanks to a substantial positioning force which limits the sliding of the accessory 4 and the wall 5 relative to one another, j) optimized resistance to vibrations caused by the positioning force, guaranteed by the tension of the assembly generated by the calibrated, controlled tightening torque, and because of the minimum distance guaranteed between the screw head 10 and the start of the thread 13, thus providing the screw 3 with minimum resilience, k) no more problems of unscrewing of the complementary component associated with incompatibility of the friction coefficient, l) no more problems of screwing of the complementary component associated with poor control of the tightening torques, m) fitting possible after production of the welding beads incorporated in the manufacturing range of the walls 5, n) fitting possible after carrying out the surface treatment of the walls 5 (painting, galvanization, cataphoresis, etc.), o) limiting of the investments associated with implementation of the insert 2 by means of a simple power bolt gun or screw driving machine (a few thousand Euro), compared with tens or hundreds of Euro for certain welding or crimping installations, p) fitting without wear of a tool such as crimping tie rods which break by fatigue after a few thousand fitting operations, q) fitting without substantial energy consumption as is the case for welding (electricity, gas, tools, etc.).

All of these advantages are described with an insert 2 as the first element for securing in the wall 5 or the support, and a screw 3 as the complementary securing element for securing of the accessory 4. It will be appreciated that these advantages are just as real with any completely different first securing element secured in a wall 5 or complementary securing element or support for securing of the accessory 4.

Although the invention has been described according to a particular embodiment, it is in no way limited to this embodiment, and variants can be added to it, as well as combinations of the variants described, without departing from the context of the present invention.

LIST OF PARTS 1. bolt
2. insert
3. screw
4. accessory
5. wall
6. insert head
7. shaft
8. recess
9. tapped part
10. screw head
11. base
12. cavity
13. threaded part
14. break ring
15. crimping collar
16. washer
17. widened part
18. indentation
19. wall opening
20. accessory opening
21. starting point of breakage
22. bracing means
23. tubular element 24. radial spreaded part
25. lubricant
26. area.

The invention claimed is:

1. Bolt (1) comprising a screw (3) and an insert (2) which can be inserted in the opening in a wall (5), said insert (2) comprising an insert head (6) and a shaft (7) comprising a recess (8), said insert head (6) and said recess (8) being configured such as, after deformation of the recess (8), to ensure the crimping of said insert (2) on said wall (5), wherein said screw (3) comprises a break ring (14), which, by being supported on said insert head (6) directly or indirectly, is designed to immobilize said screw (3) relative to said insert head (6), in order to create the deformation of the recess (8) by rotation of the screw and obtain said crimping, and, once the crimping has been carried out, it is designed to give rise to breakage, such as to release the screw (3) from said insert head (6), thus permitting the tightening of an accessory (4) on the wall (5),
wherein the break ring (14) is supported indirectly against the insert head (6) by means of bracing means (22), and
wherein the bracing means (22) comprise a washer (16) which is provided between said break ring (14) and the insert head (6).

2. Bolt (1) as claimed in claim 1, wherein said breakage takes place in the break ring (14).

3. Bolt (1) as claimed in claim 1, wherein said breakage takes place in the bracing means (22).

4. Bolt (1) as claimed in claim 1, wherein the insert (2) comprises a means for blocking said insert (2) in rotation, preferably by an external form with a non-circular transverse cross-section.

5. Bolt (1) as claimed in claim 1, wherein said screw (3) comprises a screw head (10) comprising a base (11) which is designed to be supported on the accessory (4), a cavity (12) preferably being provided below said base (11) in order to accommodate in it at least partially said break ring (14) and/or said bracing means (22).

6. Bolt (1) as claimed in claim 1, wherein said insert head (6), said break ring (14) and, if applicable, said bracing means (22) are configured such that, in the assembled position, the screw head (10) is supported on the insert (2) by means of the break ring (14) and/or bracing means (22), without being supported on said accessory (4), such as to constitute an attachment which allows said accessory (4) to be mobile in rotation and/or translation relative to the wall (5).

7. Bolt (1) as claimed in claim 1, wherein said screw (3) comprises a non-threaded part, contained between the screw head (10) and the threaded part (13), which does not cooperate with the tapped part (9) of the insert (2), such as to provide resilience necessary to create the tension of the screw (3) on said bolt in the tightened situation, even when the thicknesses of the accessories and walls are very slight.

8. Bolt (1) as claimed in claim 1, wherein said insert (2) has weakening of the recess (8), such as to facilitate its deformation during the crimping, this weakening preferably taking the form of undercuts.

9. Bolt (1) as claimed in claim 1, wherein said screw (3) comprises a non-threaded part, contained between a screw head (10) and a threaded part (13), which does not cooperate with a tapped part (9) of the insert (2), said non-threaded part being provided with a widened part (17) which is designed to make it possible to fix the broken part of the break ring (14) by forcing it to slide towards said widened part (17) during the screwing phase which follows its breakage.

10. Bolt (1) as claimed in claim 1, wherein the insert (2) contains a lubricant (25), preferably grease.

11. Bolt (1) comprising a screw (3) and an insert (2) which can be inserted in the opening in a wall (5), said insert (2) comprising an insert head (6) and a shaft (7) comprising a recess (8), said insert head (6) and said recess (8) being configured such as, after deformation of the recess (8), to ensure the crimping of said insert (2) on said wall (5), wherein said screw (3) comprises a break ring (14), which, by being supported on said insert head (6) directly or indirectly, is designed to immobilize said screw (3) relative to said insert head (6), in order to create the deformation of the recess (8) by rotation of the screw and obtain said crimping, and, once the crimping has been carried out, it is designed to give rise to breakage, such as to release the screw (3) from said insert head (6), thus permitting the tightening of an accessory (4) on the wall (5),
wherein the break ring (14) is supported indirectly against the insert head (6) by means of bracing means (22), and
wherein the bracing means (22) comprise a tubular element (23) provided with a radial spreaded part (24) which can be supported against the insert head (6).

12. Bolt (1) as claimed in claim 11, wherein said breakage takes place in the bracing means (22).

13. Bolt (1) as claimed in claim 11, wherein the insert (2) comprises a means for blocking said insert (2) in rotation, preferably by an external form with a non-circular transverse cross-section.

14. Bolt (1) as claimed in claim 11, wherein said screw (3) comprises a screw head (10) comprising a base (11) which is designed to be supported on the accessory (4), a cavity (12) preferably being provided below said base (11) in order to accommodate in it at least partially said break ring (14) and/or said bracing means (22).

15. Bolt (1) as claimed in claim 11, wherein said insert head (6), said break ring (14) and, if applicable, said bracing means (22) are configured such that, in the assembled position, the screw head (10) is supported on the insert (2) by means of the break ring (14) and/or bracing means (22), without being supported on said accessory (4), such as to constitute an attachment which allows said accessory (4) to be mobile in rotation and/or translation relative to the wall (5).

16. Bolt (1) as claimed in claim 11, wherein said screw (3) comprises a non-threaded part, contained between the screw head (10) and the threaded part (13), which does not cooperate with the tapped part (9) of the insert (2), such as to provide resilience necessary to create the tension of the screw (3) on said bolt in the tightened situation, even when the thicknesses of the accessories and walls are very slight.

17. Bolt (1) as claimed in claim 11, wherein said insert (2) has weakening of the recess (8), such as to facilitate its deformation during the crimping, this weakening preferably taking the form of undercuts.

18. Bolt (1) as claimed in claim 11, wherein the insert (2) contains a lubricant (25), preferably grease.

19. Bolt (1) comprising a screw (3) and an insert (2) which can be inserted in the opening in a wall (5), said insert (2) comprising an insert head (6) and a shaft (7) comprising a recess (8), said insert head (6) and said recess (8) being configured such as, after deformation of the recess (8), to ensure the crimping of said insert (2) on said wall (5), wherein said screw (3) comprises a break ring (14), which, by being supported on said insert head (6) directly or indirectly, is designed to immobilize said screw (3) relative to said insert head (6), in order to create the deformation of the recess (8) by rotation of the screw and obtain said crimping, and, once the crimping has been carried out, it is designed to give rise to breakage, such as to release the screw (3) from said insert head (6), thus permitting the tightening of an accessory (4) on the wall (5), wherein the break ring (14) is supported indirectly against the insert head (6) by means of bracing means (22), wherein the bracing means (22) comprise a tubular element (23) provided with a radial spreaded part (24) which can be supported against the insert head (6), and wherein said break ring (14) is constituted by the screw head (10).

20. Bolt (1) comprising a screw (3) and an insert (2) which can be inserted in the opening in a wall (5), said insert (2) comprising an insert head (6) and a shaft (7) comprising a recess (8), said insert head (6) and said recess (8) being configured such as, after deformation of the recess (8), to ensure the crimping of said insert (2) on said wall (5), wherein said screw (3) comprises a break ring (14), which, by being supported on said insert head (6) directly or indirectly, is designed to immobilize said screw (3) relative to said insert head (6), in order to create the deformation of the recess (8) by rotation of the screw and obtain said crimping, and, once the crimping has been carried out, it is designed to give rise to breakage, such as to release the screw (3) from said insert head (6), thus permitting the tightening of an accessory (4) on the wall (5), wherein said breakage takes place in the break ring (14), wherein the screw (3) comprises a screw head (10) and a threaded part (13), wherein the screw head (10) comprises a male indentation (18) having external dimensions which are greater than an external diameter of the threaded part (13), wherein the screw head (10), the male indentation (18), and the threaded part (13) are formed in one piece, and wherein the break ring (14) is provided between the screw head (10) and the threaded part (13) of the screw (3), the break ring (14) being spaced apart from the screw head (10).

21. Bolt (1) as claimed in claim 20, wherein the break ring (14) is supported directly against the insert head (6).

22. Bolt (1) as claimed in claim 20, wherein the insert (2) comprises a means for blocking said insert (2) in rotation, preferably by an external form with a non-circular transverse cross-section.

23. Bolt (1) as claimed in claim 20, wherein said screw (3) comprises a screw head (10) comprising a base (11) which is designed to be supported on the accessory (4), a cavity (12) preferably being provided below said base (11) in order to accommodate in it at least partially said break ring (14) and/or said bracing means (22).

24. Bolt (1) as claimed in claim 20, wherein said insert head (6), said break ring (14) and, if applicable, said bracing means (22) are configured such that, in the assembled position, the screw head (10) is supported on the insert (2) by means of the break ring (14) and/or bracing means (22), without being supported on said accessory (4), such as to constitute an attachment which allows said accessory (4) to be mobile in rotation and/or translation relative to the wall (5).

25. Bolt (1) as claimed in claim 20, wherein said screw (3) comprises a non-threaded part, contained between the screw head (10) and the threaded part (13), which does not cooperate with the tapped part (9) of the insert (2), such as to provide resilience necessary to create the tension of the screw (3) on said bolt in the tightened situation, even when the thicknesses of the accessories and walls are very slight.

26. Bolt (1) as claimed in claim 20, wherein said insert (2) has weakening of the recess (8), such as to facilitate its deformation during the crimping, this weakening preferably taking the form of undercuts.

27. Bolt (1) as claimed in claim 20, wherein said screw (3) comprises a non-threaded part, contained between the screw head (10) and the threaded part (13), which does not cooperate with the tapped part (9) of the insert (2), said non-threaded part being provided with a widened part (17) which is designed to make it possible to fix the broken part of the break ring (14) by forcing it to slide towards said widened part (17) during the screwing phase which follows its breakage.

28. Bolt (1) as claimed in claim 20, wherein the insert (2) contains a lubricant (25), preferably grease.

29. Method for securing an accessory (4) on a wall (5) by means of a bolt (1), the bolt comprising a screw (3) and an insert (2) which can be inserted in the opening in a wall (5), said insert (2) comprising an insert head (6) and a shaft (7) comprising a recess (8), said insert head (6) and said recess (8) being configured such as, after deformation of the recess (8), to ensure the crimping of said insert (2) on said wall (5), wherein said screw (3) comprises a break ring (14), which, by being supported on said insert head (6) directly or indirectly, is designed to immobilize said screw (3) relative to said insert head (6), in order to create the deformation of the recess (8) by rotation of the screw and obtain said crimping, and, once the crimping has been carried out, it is designed to give rise to breakage, such as to release the screw (3) from said insert head (6), thus permitting the tightening of an accessory (4) on the wall (5), wherein said accessory (4) comprises an accessory opening (20) designed to allow the insert head (6) to pass through, and said wall (5) comprises a wall opening (19) designed to allow the shaft (7) of the insert (2) to pass through, the method comprising the steps of:
  a) arranging the accessory (4) on the wall (5), such as to align the accessory (20) and wall (19) openings,
  b) introducing the bolt (1) into the openings thus aligned, in the direction from the accessory (4) towards the wall (5), until the insert head (6) is applied on the wall (5),
  c) rotating the screw (3), with a thread (13) of the screw (3) cooperating with a tapping (9) of the insert (2), the break ring (14) being supported on the insert head (6), if applicable by means of bracing means (22), thus creating deformation of the recess (8) below the wall (5), and consequently carrying out the crimping of the insert (2) on the wall (5),
  d) increasing the torque until breakage is obtained, thus releasing the screw (3) from the insert head (6), and
  e) continuing rotation of the screw (3) until the accessory (4) is tightened on the wall (5).

* * * * *